United States Patent [19]
Naidich

[11] 3,990,076
[45] Nov. 2, 1976

[54] PSEUDO PULSE DOPPLER RADAR

[75] Inventor: Herbert H. Naidich, Trumbull, Conn.

[73] Assignee: United Technologies Corporation, Hartford, Conn.

[22] Filed: May 22, 1975

[21] Appl. No.: 580,000

[52] U.S. Cl. .............................................. 343/7.7
[51] Int. Cl.$^2$ ........................................... G01S 9/42
[58] Field of Search ...................................... 343/7.7

[56] References Cited
UNITED STATES PATENTS

| | | | |
|---|---|---|---|
| 2,997,707 | 8/1961 | Parker | 343/7.7 |
| 3,267,468 | 8/1966 | Stull, Jr. | 343/7.7 |
| 3,341,847 | 9/1967 | Fried et al. | 343/7.7 X |
| 3,465,336 | 9/1969 | Fishbein et al. | 343/7.7 |
| 3,576,564 | 4/1971 | Galvin | 343/7.7 |
| 3,594,800 | 7/1971 | Stoney | 343/7.7 |

*Primary Examiner* — Malcolm F. Hubler
*Attorney, Agent, or Firm* — M. P. Williams

[57] ABSTRACT

An amplitude monopulse radar, in which quadrature sum and difference signals are processed in order to determine the magnitude and direction of antenna tracking angle error, utilizes coherent detection which clutter reference for moving target indication (MTI) operation. In the absence of clutter, point targets (both fixed and moving) are detected on a per-pulse coherent basis (as between the sum and difference, in phase and quadrature signal channels) using as a reference either signal channel noise or an oscillator nominally at the IF frequency. Both modes of operation are accommodated by using bandpass doppler filters which are convertible to low pass filters in order to permit zero-doppler signals relating to point targets to pass in the absence of clutter, the filter mode being selected by a point target discriminator which senses the presence of clutter in range bins straddling the signal range bin. The dual mode filter may consist of a high frequency, low pass filter and a low frequency, low pass filter, the presence of clutter causing the low frequency characteristic to be subtracted from the high frequency characteristic so as to form a bandpass filter.

8 Claims, 4 Drawing Figures

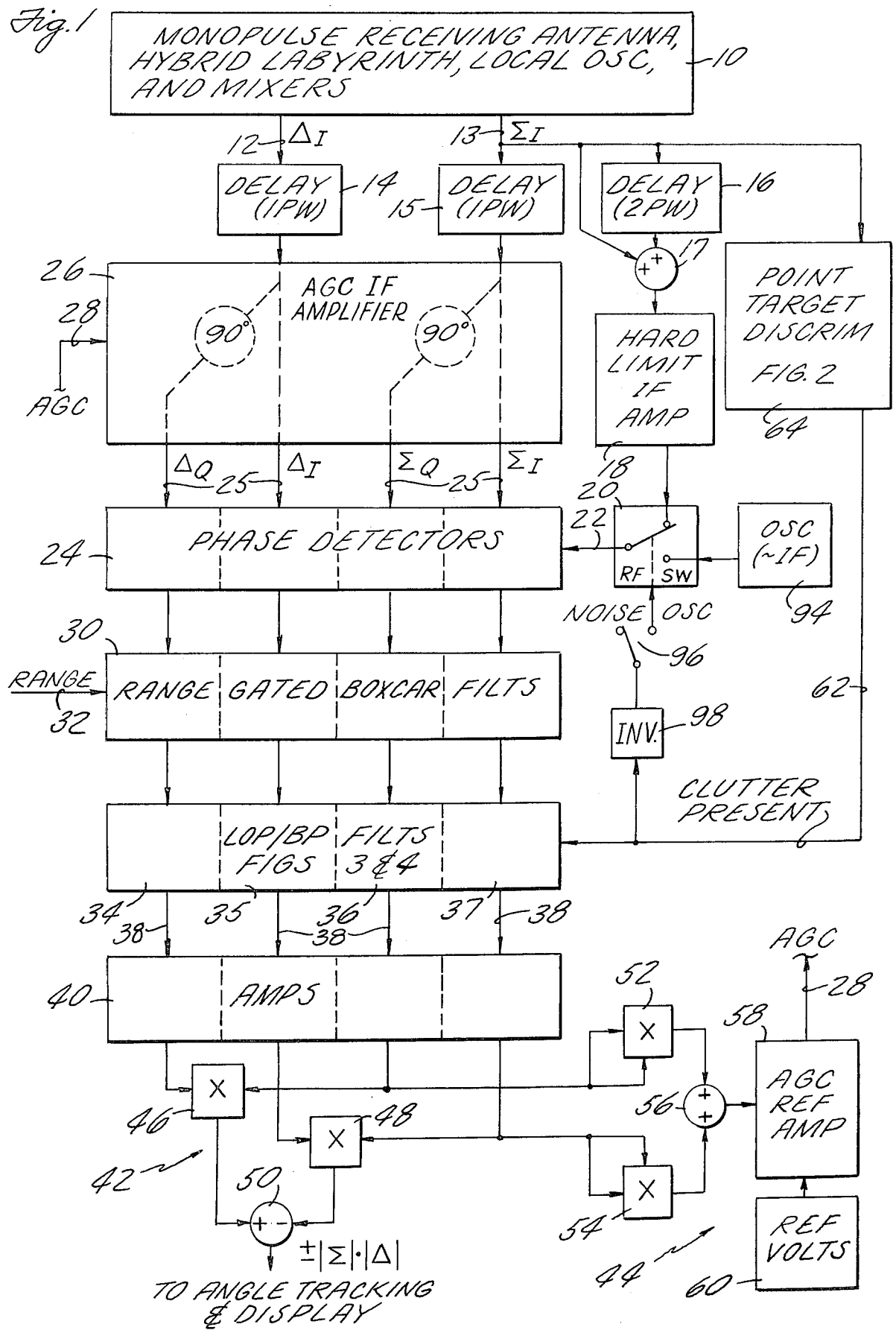

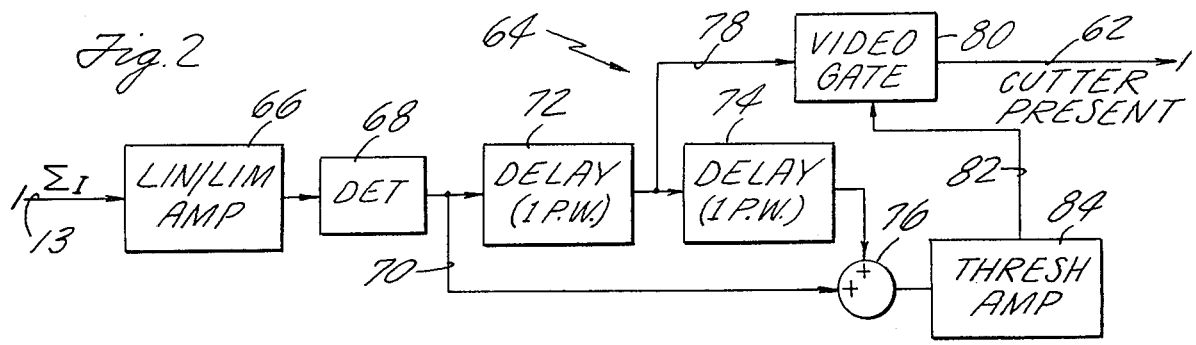
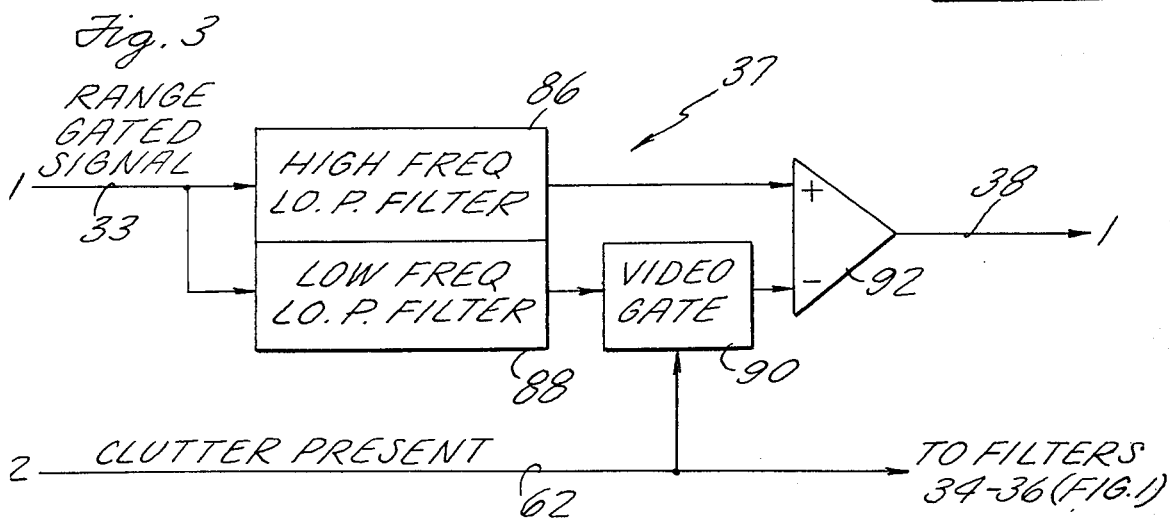
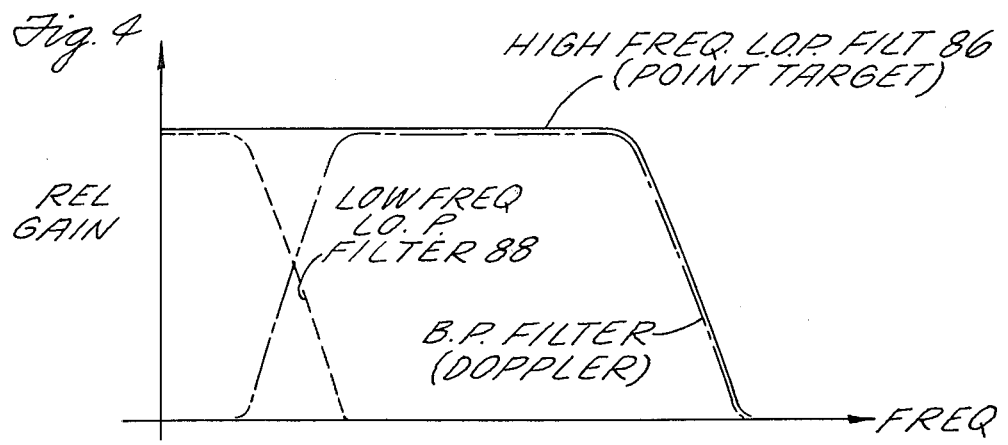

PSEUDO PULSE DOPPLER RADAR

BACKGROUND OF THE INVENTION

1. Field of Invention

This invention relates to improvements in angle tracking and in moving target indicating radars.

2. Description of the Prior Art

The tracking of moving targets in clutter (such as land vehicles traveling on rough terrain or in forests, and aircraft in heavy rain cover) by means of clutter-referenced phase detection and doppler-filtered processing is well known. Such radar systems are unable to detect point targets (targets which are in clear, not surrounded by clutter) since there is no reference signal for the coherent detection of the target signal. To overcome this, some radar systems have provided two separate channels, one coherent and one incoherent, with selection of the correct channel in dependence upon the presence of clutter (such as Davis et al U.S. Pat. No. 3,080,557) or with simultaneous display of both channels (such as Parker U.S. Pat. No. 2,997,707); and, one system known to the art (Shrader U.S. Pat. No. 3,220,002) utilizes the clutter both before and following the target (as provided by delay circuits) to phase detect the signals in the presence of clutter, and utilizes noise to detect the signals in the absence of clutter. However, this circuit requires a clutter subtraction circuit since clutter signals are otherwise presented at all ranges of response of the system; additionally, this system does not appear to be adaptable for use in clutter-detected angle tracking MTI radars (such as those illustrated in Stoney U.S. Pat. Nos. 3,365,715 and 3,594,800, which employ monopulse angle tracking of moving targets in clutter, but are insensitive to point targets in the absence of clutter).

SUMMARY OF INVENTION

An object of the present invention is to provide an improved radar system operable to detect and/or track targets in clutter and targets in the clear.

According to the present invention, phase detected target return signals are bandpass filtered to remove clutter when detected using clutter as a reference, and, in the absence of clutter, are low pass filtered after detection using either noise or a reference oscillator output as the reference signal.

In accordance with an embodiment of the invention, an angle tracking radar having sum and difference signals processed in the form of in-phase (I) and quadrature (Q) components includes a variable mode filter for each channel, which is operable in a doppler-filtering, bandpass mode in response to the presence of clutter used as the detector reference signal, and operable in a point target (zero doppler) signal passing, low pass filter mode in the absence of clutter, when the return signals are phase detected in response to either noise or a reference oscillator, as desired.

The present invention provides per-pulse coherence between the sum and difference in-phase and quadrature channels, thereby to permit sensing not only the magnitude but also the direction of antenna angle tracking error whether the signals are detected by a clutter reference or by noise or oscillator reference. Through the simple means of altering the pass characteristic of the post-detection filters, the invention provides full angle racking capability for targets in clutter and in the clear, as well as moving target indication, in an angle tracking radar. In any clutter-referenced MTI radar, the invention provides a simple means to accommodate targets in the clear as well as targets in clutter.

The foregoing and various other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a simplified, partial schematic block diagram of a pseudo pulse doppler angle tracking radar system in accordance with the present invention;

FIG. 2 is a schematic block diagram of a point target discriminator for utilization in the embodiment of FIG. 1;

FIG 3 is a block diagram of an exemplary dual mode filter for use in the embodiment of FIG. 1; and FIG. 4 is an illustration of the pass characteristics of the dual mode filter illustrated in FIG. 3.

DESCRIPTION OF THE PREFERRED EMBODIMENT

Referring now to FIG. 1, an exemplary embodiment of the invention includes amplitude monopulse angle tracking radar apparatus for tracking a target in a single plane, such as azimuth or elevation but not both. It should be understood that an additional difference channel coupled to the usual additional antenna means, responsive in another plane, may be provided (and perhaps normally would be) in a well known fashion. Since the invention herein relates only to the receiving portion of an amplitude monopulse angle tracking radar, the transmitter portion has been eliminated herein for simplicity.

The receiving portion includes a monopulse antenna front-end 10 of a usual variety, including a monopulse receiving antenna, a hybrid labyrinth, a local oscillator and mixers for each desired channel, all as is very well known in the art. The radar front-end 10 may provide two different outputs comprising the in-phase components of the difference signal ($\Delta_I$) on the channel 12 and the in-phase component of the sum signal ($\sigma_I$) on the channel 13 to respective delay units 14, 15, each having a delay of about one pulsewidth. The in-phase sum signal on the line 13 is passed through a delay unit 16 (having a delay of about two pulsewidths) and is also passed directly to a summing junction 17 at the input of a hard-limited IF amplifier 18, and through an RF switch 20 (described hereinafter) to provide a signal at the reference input 22 of a plurality of phase detectors 24 (one for each signal channel), to which four signals ($\Delta_Q$, $\Delta_I$, $\sigma_Q$, $\sigma_I$) are fed over related channels 25 after amplification in IF amplifiers 26 having automatic gain control provided by an AGC signal on a line 28, and including phase shifters 29 to provide quadrature signals in a well known fashion. In the present embodiment, quadrature signal processing has been illustrated for purposes described hereinafter. However, the invention may be used in a system having an alternate processing scheme The quadrature signals may alternatively be provided by employing both in-phase and 90° phase-shifted outputs of the local oscillator as supplied to the mixers, or by utilization of a suitable hybrid labyrinth, if either is more appropriate in a given implementation of the present invention. The reference input 22 to the phase detectors 24 derives the detection reference signal either as a function of clutter or noise in the range bins immediately preceding and immediately succeeding the range bin of the signals being phase detected (as are provided on the channels 25). This is due to the fact that the summing unit 17 presents the in-phase sum IF signal directly to the hard-limited IF amplifier 18 whereas the delay unit 16 provides the in-phase sum signal after a delay of two pulsewidths (which is on the order of two range bins). In contrast, the AGC IF amplifiers 26 receive the signals after one range bin delay from the delay units 14, 15. In this fashion, with respect to any one of the channels 25, phase detection in response to either clutter or noise is achieved in exactly the same fashion as is described in FIG. 3 of the aforementioned Shrader U.S. Pat. No. 3,220,002.

The detected signals are applied to respective range gated boxcar filters 30 which stretch each signal selected by a range gate signal on a line 32 (provided in any conventional manner). The signals are preferably stretched to a length approximately equal to the reciprocal of the pulse repetition frequency of the radar in order to stretch the pulsewidth to obtain maximum processing energy, in a well known fashion. The range gated signals are applied over channels 33 to dual mode, low pass/bandpass filters 34–37 which, as is described more fully hereinafter with respect to FIGS. 3 and 4, provide a bandpass characteristic in the presence of clutter and provide a low pass characteristic for targets in the clear. This permits filtering out the DC and low frequency components of the signals, which relate to clutter, whenever moving targets are being detected in clutter, and permits passing zero-doppler (DC and/or low frequency signals relating to point targets in the clear, when detection is based upon noise or a reference oscillator, rather than clutter, as is described more fully hereinafter.

The detected signals are passed over channels 38 through related amplifiers 40 to processing circuitry 42 that determines the magnitude and sense of the angle tracking error, and to processing circuitry 44 which generates the AGC signal on the line 28.

As is known, when a pair of phase detectors (such as the in-phase and quadrature detectors for the sum channel, or such as the in-phase and quadrature detectors for the difference channel) are operated in quadrature, they produce outputs which are respectively proportional to the orthogonal components of the related phasors, as is known. For instance, $$\Delta_I = C\sin\phi + \Delta\sin(\omega_{313} - \omega_C)T \qquad (1)$$

$$\Delta_Q = C\cos\phi + \Delta\cos\omega\ - \omega_C)t \qquad (2)$$

where C represents the magnitude of the clutter and $\Delta$ represents the amplitude in the difference channel, which is preserved whenever the signal channel amplification is not limited (as in the present case where it is normalized with AGC). Since the clutter phase angle ($\phi$) does not change from pulse to pulse, the first terms of expressions (1) and (2) are DC components proportional to clutter, whereas the second term in each expression contains the doppler target frequency at an amplitude proportional to the magnitude of the target return signal from the moving target. Thus, the quadrature detection allows the sense of the doppler to be recovered (that is, whether the target is moving toward or away from the radar) as well as improvements in the signal to noise ratio.

Letting $\omega$ represent the doppler frequency in expressions (1) and (2), the error in the antenna tracking angle may be detected from the trigonometric identity:

$$[\Delta\cos(\omega t+\theta)][\Sigma\cos\omega t] - [\Delta\sin(\omega t+\theta)][\Sigma\sin\omega t] = \Sigma\Delta\cos\theta. \qquad (3)$$

The magnitude of the error is contained in the $\Delta$ term, since the $\Sigma$ is held constant by the AGC action, which is determined from the identity:

$$\Sigma^2\sin^2\omega t + \Sigma^2\cos^2\omega t = \Sigma^2 \qquad (4)$$

Thus, the magnitude and sense of the angle tracking error is provided in accordance with the expression (3) by a pair of multipliers 46, 48 and a differencing circuit 50, and the AGC signal is developed in accordance with the expression (4) by a pair of multipliers 52, 54 and a summing circuit 56. The summing circuit 56 feeds an AGC reference amplifier 58, which is controlled by a source of reference voltage 60, as is well known in the art, to develop the AGC signal on the line 28.

It should be noted that an important aspect of the present invention is in preserving the amplitude and phase information contained within the sum and difference channels by means of quadrature detection as described hereinbefore. When the reference signal applied on the reference input 22 to the phase detectors 24 is developed as a function of clutter, the filters 34–37 must be bandpass filters in order to filter out the DC and low frequency clutter before processing in the circuits 40, 42, 44. However, when the reference signal on the line 22 is developed in response to noise in the circuitry (or a reference oscillator, hereinafter) in the case of point targets in the absence of clutter, the pulse-to-pulse coherence between the signals is lost, yet it still retains coherence as between the four channels 25, even after phase detecting, on a single pulse basis, which permits the same extraction of angle error and AGC information as in the case of clutter, as described hereinbefore. However, since the signals referenced to noise have a zero doppler, these signals would be lost by doppler filtering; therefore, the mode of operation of the filters 34–37 is switched to a low pass filter mode of operation, in response to the absence of a clutter present signal on a line 62, as developed by a point target discriminator 64 which is described more fully with respect to FIG. 2 hereinafter.

To operate the point target discriminator 64, the in-phase sum signal in the channel 13 (FIG. 1) is also provided to a linear/limit amplifier 66 (FIG. 2) (which alternatively may be an AGC-controlled IF amplifier, as are the amplifiers 26, if desired) to produce a signal including clutter (when it is present) which can be tested to see if it is above a given threshold. This is converted to a video signal in an asynchronous detector 68 (which may include suitable amplification and level adjusting) for application on a signal line 70 to a first delay unit 72 and to a second delay unit 74, as well as to a summing circuit 76. Between the delay unit 72, 74 a signal is tapped off on a line 78 for application to a video gate 80. The video gate is controlled by a signal on a line 82 from a threshold amplifier 84 which is responsive to the summing circuit 76. The delay period of the delay units 72, 74 is on the order of the pulsewidth of the radar, such that the delay represents essentially one range bin. Thus, a target return signal which has passed through the delay unit 72 and is being applied to the video gate 80 will be selectively gated therethrough in dependence upon there being clutter present in the preceding range bin (as indicated by a signal output of the delay unit 74) or there being clutter present in the succeeding range bin (as indicated by a signal present on the line 70). The stronger of these will cause the summing circuit 76 to operate the threshold amplifier 84 so as to provide the gate signal on the line 82, provided the output of the summing circuit 76 is above a minimum threshold magnitude indicative of adequate clutter for phase detection of the four signal channels (FIG. 1).

When the point target discriminator 64 of FIG. 2 indicates by the signal on the line 62 that there is sufficient clutter present, this causes the dual mode filters 34-37, of which the filter 37 is exemplary and illustrated in FIG. 3, to operate as a bandpass filter to filter out the doppler in the signal lines, as is illustrated by the relationships of FIG. 4. The dual mode filter 37 illustrated in FIG. 3 comprises a high frequency, low pass filter 86 and a low frequency, low pass filter 88 together with a video gate 90 which feeds a subtracting circuit 92 to provide the filtered signal output on the line 38 to the related one of the amplifiers 40 (FIG. 1). When the signal is present on the line 62 (indicating that there is sufficient clutter present for proper detection of the four signal channels the video gate 90 is operated and causes the output of the low frequency, low pass filter 88 to be subtracted from the output of the high frequency low pass filter 86 so that the output of the summing circuit 92 is equivalent to a bandpass filter, thus passing the video which has doppler frequency, but eliminating the DC and low frequency clutter components from the signal. However, when insufficient doppler is present, the threshold amplifier 84 (FIG. 2) does not provide a gate signal on a line 82, so that the video gate 80 is inoperative, thereby eliminating the signal on the line 62. In FIG. 3, this causes the video gate 90 to be inoperative so that the output of the subtracting circuit 92 is simply a low pass filter having a high frequency break point, whereby all of the signals can pass, including DC signals (zero doppler signals) provided by detection in response to noise reference (or the oscillator as described hereinafter).

Referring to FIG. 1, it should be noted that there is no need to switch references, since noise will be presented by the hard-limited IF amplifier 18 through the switch 20 over the line 22 and to the phase detectors 24 simply from the absence of clutter. However, if desired, instead of detecting with noise, detection may be made with an oscillator 94 which is nominally at the IF frequency. In such case, a switch 96 must be moved from the normally open, noise position (as shown) into the closed, oscillator position, so that when clutter is not present (as indicated by the absence of a signal on the line 62) an inverter 98 can cause the operation of the electronic switch 20 so that it will connect the oscillator 94 to the line 22 rather than connecting the hard-limited IF amplifier 18 to the line 22. But with the switch 96 in the open position as shown, the hard-limited IF amplifier 18 is always connected to the line 22, and with the switch 96 closed, the hard-limited IF amplifier 18 is connected to the line 22 only whenever there is clutter present.

Although the invention has been shown and described with respect to a preferred embodiment thereof, it should be understood by those skilled in the art that various changes, omissions and additions in and to the form and detail thereof may be made therein without departing from the spirit and the scope of the invention.

Having thus described a typical embodiment of my invention that which I claim a new and desire to secure by Letters Patent of the U.S. is:

1. In a moving target indicating radar of the type including phase detectors in which target signals are phase detected and means responsive to radar return signals to provide signals for use as phase detector reference signals, said means providing signals derived from clutter in the presence thereof and derived from noise in the absence of clutter, the improvement comprising:
   a dual mode filter responsive to the phase detected radar target signals, said dual mode filter being operable in first and second modes, alternatively in dependence on a control signal, said filter when operating in said first mode having a low pass characteristic which allows passage therethrough of detected signals having substantially zero doppler components as provided by detecting said radar target signals in response to noise in the reference channel, and when in said second mode having a bandpass characteristic which permits passage of doppler signals but not passage of DC and low frequency clutter components; and
   means responsive to radar return signals for detecting the presence of clutter in a range bin other than the range bin in which the target is detected for providing said control signal to set said dual mode filter into said second mode in response to the presence of clutter.

2. The improvement according to claim 1 further comprising:
   an oscillator operating substantially at the IF frequency of said radar; and
   means responsive to the absence of said control signal for selectively disconnecting the return signal responsive means from the reference input of the phase detectors and for connecting said oscillator to the reference input of the phase detectors.

3. The improvement according to claim 1 wherein said dual mode filter comprises a pair of low pass filters, a first one having a high frequency break point established to pass low frequency and DC signals relating to the clutter components, and a second one having a high frequency break point in excess of the frequency of doppler-shifted target signals which are desired to be detected by said radar; and
   means for subtracting the output of said first filter from the output of said second filter for providing a substantially bandpass characteristic.

4. The improvement according to claim 3 wherein there is provided a gate circuit between said first filter and the subtraction circuit, said gate circuit being operable in response to said control signal for enabling said gate, thereby to pass signals from said first filter to said subtraction circuit in the presence of clutter.

5. The improvement according to claim 1 wherein said radar return signals responsive means comprises:
   an asynchronous detector for detecting a radar return sum signal;

first and second delay means each having a delay of about one range bin connected to the output of said detector;

a threshold amplifier having a summing junction for summing the signal output of said second delay means and the signal output of said detector and providing a gate signal in response to either signal applied to said summing junction being in excess of a given magnitude; and a video gate for passing a signal derived from the junction between said delay units in response to the presence of said gate signal, the output of said video gate comprising said control signal.

6. A pseudo pulse doppler, amplitude monopulse, moving target indicating, radar system comprising:

means including monopulse radar receiver front-end means providing in-phase and quadrature components of monopulse sum and difference signals;

means, including delay means and a hard-limited amplifier, which in the absence of target return signals provides noise, responsive to a radar return sum signal for generating a phase detector reference signal;

a plurality of phase detectors, one for each of said in-phase and quadrature, sum and difference signals, each responsive to the reference signal for detecting the related target return signals applied thereto;

a dual mode filter responsive to the phase detected radar target signals, said dual mode filter being operable in first and second modes, alternatively in dependence on a control signal, said filter when operating in said first mode having a low pass characteristic which allows passage therethrough of detected signals having substantially zero doppler components as provided by detecting said radar target signals in response to noise in the reference channel, and when in said second mode having a bandpass characteristic which permits passage of doppler signals but not passage of DC and low frequency clutter components; and means responsive to radar return signals for detecting the presence of clutter in a range bin other than the range bin in which the target is detected for providing said control signal to set said dual mode filter into said second mode in response to the presence of clutter.

7. The system according to claim 6 further comprising:

an oscillator operating substantially at the IF frequency of said radar; and means responsive to the absence of said control signal for selectively disconnecting the return signal responsive means from the reference input of the phase detectors and for connecting said oscillator to the reference input of the phase detectors.

8. A system according to claim 6 wherein said radar return signal responsive means comprises:

an asynchronous detector for detecting a radar return sum signal;

first and second delay means each having a delay of about one range bin connected to the output of said detector;

a threshold amplifier having a summing junction for summing the signal output of said second delay means and the signal output of said detector and providing a gate signal in response to either signal applied to said summing junction being in excess of a given magnitude; and a video gate signal for passing a signal derived from the junction between said delay units in response to the presence of said gating signal, the output of said video gate comprising said control signal.

* * * * *

UNITED STATES PATENT OFFICE
CERTIFICATE OF CORRECTION

PATENT NO. : 3,990,076
DATED : November 2, 1976
INVENTOR(S) : Herbert H. Naidich It is certified that error appears in the above-identified patent and that said Letters Patent are hereby corrected as shown below:

In the Abstract, line 4, "which" should read --with--

Column 1, line 14, after "in" insert --the--

Column 1, line 68, "racking" should read --tracking--

Column 2, line 62, after "scheme" insert --.--

Column 3, line 35, after "frequency" insert --)--

Column 3, line 52, "$\Delta_I = C\sin\phi + \Delta\sin(\omega_{313} - \omega_C)T$" should read
--$\Delta_I = C\sin\phi + \Delta\sin(\omega_\Delta - \omega_C)t$--

Column 3, line 54, "$\Delta_Q = C\cos\phi + \Delta\cos\omega - \omega_C)t$ should read
--$\Delta_Q = C\cos\phi + \Delta\cos(\omega_\Delta - \omega_C)t$--

Column 4, line 10, after "Σ" insert --term--

Signed and Sealed this

Fifteenth Day of February 1977

[SEAL]

*Attest:*

RUTH C. MASON
*Attesting Officer*

C. MARSHALL DANN
*Commissioner of Patents and Trademarks*